United States Patent
Ye et al.

(10) Patent No.: US 7,729,933 B2
(45) Date of Patent: Jun. 1, 2010

(54) DECISION SUPPORT ACTIVATION AND MANAGEMENT IN PRODUCT LIFE CYCLES USING A CONTEXT PYRAMID STRUCTURE

(75) Inventors: Yiming Ye, White Plains, NY (US); Haiyan Wang, legal representative, White Plains, NY (US); Liang-Jie Zhang, Cortlandt Manor, NY (US); John Youssef Sayah, Sleepy Hollow, NY (US); Jen-Yao Chung, Yorktown Heights, NY (US); Santhosh B. Kumaran, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1976 days.

(21) Appl. No.: 10/699,020

(22) Filed: Oct. 31, 2003

(65) Prior Publication Data

US 2005/0096951 A1 May 5, 2005

(51) Int. Cl.
*G06Q 10/00* (2006.01)
(52) U.S. Cl. ............ 705/7; 705/2; 707/1; 707/10; 707/100; 707/101; 707/104.1; 709/203; 709/217; 715/749; 715/760; 715/853; 715/854; 715/855; 718/100; 718/102; 345/440
(58) Field of Classification Search ............ 705/7
See application file for complete search history.

(56) References Cited

U.S. PATENT DOCUMENTS

| | | | | |
|---|---|---|---|---|
| 6,026,410 A * | 2/2000 | Allen et al. | ............... | 707/104.1 |
| 6,029,171 A * | 2/2000 | Smiga et al. | ............... | 707/102 |
| 6,144,962 A * | 11/2000 | Weinberg et al. | ............... | 707/10 |
| 6,158,903 A * | 12/2000 | Schaeffer et al. | ............... | 709/204 |
| 6,421,678 B2 * | 7/2002 | Smiga et al. | ............... | 707/102 |
| 6,622,147 B1 * | 9/2003 | Smiga et al. | ............... | 707/102 |
| 6,697,810 B2 * | 2/2004 | Kumar et al. | ............... | 707/10 |
| 6,754,677 B1 * | 6/2004 | Cho et al. | ............... | 707/201 |
| 6,952,660 B1 * | 10/2005 | Matheson | ............... | 703/1 |
| 7,007,235 B1 * | 2/2006 | Hussein et al. | ............... | 715/751 |
| 7,039,597 B1 * | 5/2006 | Notani et al. | ............... | 705/9 |

(Continued)

OTHER PUBLICATIONS

Pyron, Special Edition Using Microsoft Project 2002, Que Publishing, Aug. 5, 2002, p. 1-47.*

(Continued)

*Primary Examiner*—Beth V Boswell
*Assistant Examiner*—Justin M Pats
(74) *Attorney, Agent, or Firm*—Marcia L. Doubet

(57) ABSTRACT

Techniques are provided for product life cycle management over an information network. More particularly, techniques are provided for decision support activation and management in accordance with a product life cycle management process such as a collaborative design process. In one aspect of the invention, a technique for managing at least one collaborative process performed in accordance with a first entity and at least a second entity, comprises the following steps/operations. Information associated with the at least one collaborative process is obtained. Based on at least a portion of the obtained information, an information structure (e.g., a context pyramid) representative of the collaborative process is dynamically maintained so as to assist at least one of the first entity and the second entity in managing at least a portion of the collaborative process.

20 Claims, 17 Drawing Sheets

U.S. PATENT DOCUMENTS

| | | | |
|---|---|---|---|
| 7,146,381 B1 * | 12/2006 | Allen et al. | 707/104.1 |
| 7,184,940 B2 * | 2/2007 | Matheson | 703/1 |
| 2002/0156693 A1 | 10/2002 | Stewart et al. | |
| 2003/0023679 A1 | 1/2003 | Johnson et al. | |
| 2003/0033191 A1 * | 2/2003 | Davies et al. | 705/10 |
| 2003/0097410 A1 | 5/2003 | Atkins et al. | |
| 2004/0034662 A1 * | 2/2004 | Austin et al. | 707/104.1 |
| 2005/0065903 A1 | 3/2005 | Zhang et al. | |
| 2007/0018983 A1 * | 1/2007 | Vimme | 345/440 |
| 2007/0299707 A1 * | 12/2007 | Bentsen et al. | 705/7 |

OTHER PUBLICATIONS

Szeliski and Shum, Motion Estimation with Quadtree Splines, Digital Equiipment Corporation Cambridge Research Lab, Mar. 1995, p. 1-36.*

Li et al., Multimedia Content Description in the InfoPyramid, IBM T.J. Watson Research Center, IEEE, 1998, p. 3789-3792.*

Falby et al., NPSNET: Hierarchical Data Structures for Real-Time Three Dimensional Visual Simulation, Computer & Graphics, vol. 17, No. 1, p. 65-69, 1993 (online reprint p. 1-13).*

U.S. Appl. No. 10/665,699, filed Sep. 19, 2003, L.J. Zhang et al.

G. Fisher et al., "Adding Rule Based Reasoning to a Demonstrational Interface Builder," Proceedings of UIST'92, pp. 89-97, Nov. 1992.

* cited by examiner

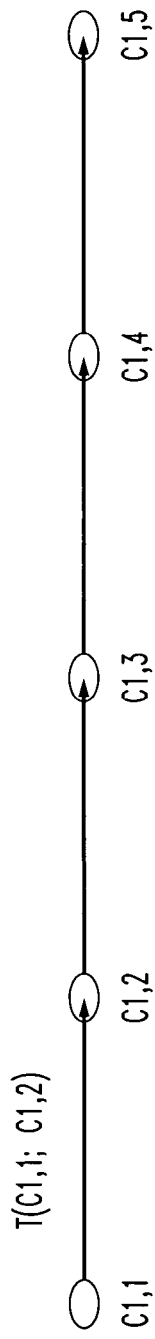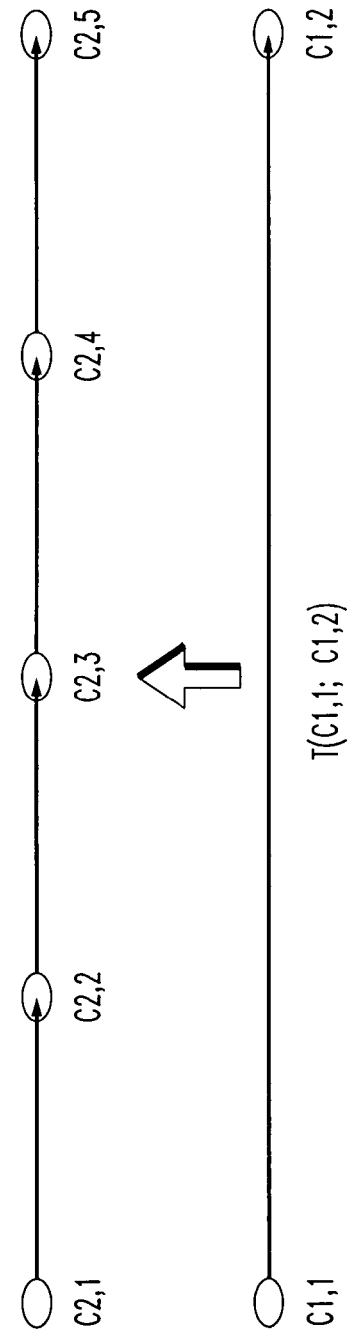
FIG. 8
FIG. 9

YDT-DC PROJECT VIEW

*FIG. 19B*
PYRAMID

FIG. 19C
OFFSET CALCULATION

| | | |
|---|---|---|
| ⊟ T61_M_DESIGN<br>YMDC | OFFSET: | T_M Design − 60 |
| ⊟ T61_E_DESIGN<br>YEDC | OFFSET: | T_E Design − 60 |
| ⊟ T61_M&E_DESIGN<br>YA-DC | OFFSET: | max { T_E Design − 60, T_M Design − 60} |
| ⊞ T61_MOTHER_BOARD<br>LAT-DC | OFFSET: | max {T_E Design − 60, T_M Design − 60, T_ASIC − 60} + T_Board − 15 |
| ⊞ T61_ASIC_CHIP<br>NI-DC | OFFSET: | T_ASIC − 60 |
| NOTEBOOK T61<br>YDT-DC | OFFSET: | max {T_E Design − 60, T_M Design − 60, T_ASIC − 60} + T_Board − 15 |

IT MUST BE CALCULATED AFTER ALL M&E, ASIC
AT ANY TIME t, IF T_ASIC etc. WILL TAKE THE VALUE OF t FOR THE CALCULATION

FIG. 19D
CHECKPOINT CALCULATION

| | |
|---|---|
| ⊟ T61 M DESIGN<br>YMDC | T_M Design − 60 + 60 |
| ⊟ T61 E DESIGN<br>YEDC | T_E Design − 60 + 60 |
| ⊟ T61 M&E DESIGN<br>YA-DC | max { T_E Design − 60, T_M Design − 60} + 60 |
| ⊞ T61 MOTHER BOARD<br>LAT-DC | (T_Board − 15) + max{T_E Design − 60,<br>T_M Design − 60, T_ASIC − 60} + 60 |
| ⊞ T61 ASIC CHIP<br>NI-DC | OFFSET: T_ASIC − 60 + 60 |
| NOTEBOOK T61<br>YDT-DC | SAME AS MOTHERBOARD<br>IT MUST BE CALCULATED AFTER ALL M&E, ASIC |

AT ANY TIME t, IF T_ASIC etc. WILL TAKE THE VALUE OF t FOR THE CALCULATION

FIG. 19E
ENERGY CALCULATION $$0.5 * \text{SIGN}[\text{CheckPoint} - \text{BaseCheckPoint}] * K * [\text{CheckPoint} - \text{BaseCheckPoint}]^2$$

HERE K GIVES THE IMPORTANCE OF THE PROCESS

FIG. 20

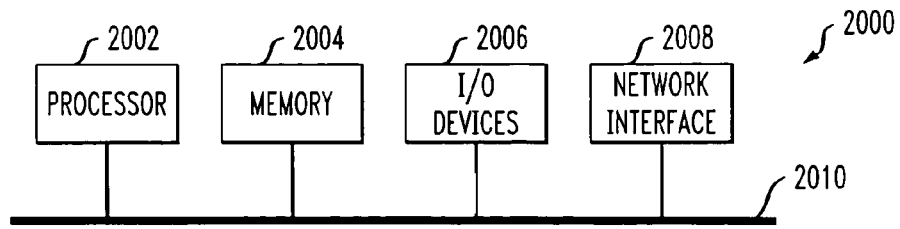

DECISION SUPPORT ACTIVATION AND MANAGEMENT IN PRODUCT LIFE CYCLES USING A CONTEXT PYRAMID STRUCTURE

FIELD OF THE INVENTION

The present invention generally relates to product life cycle management over an information network and, more particularly, to techniques for providing decision support activation and management in accordance with a product life cycle management process such as a collaborative design process.

BACKGROUND OF THE INVENTION

Tracking and monitoring activities during the development of a product are essential to ensuring schedule integrity and timely delivery. As product development has evolved into a process involving multiple partners from different enterprises and operating in different geographic locations and across multiple time zones, the monitoring for the purposes of managing the product life cycle has taken on added complications. Currently, the monitoring of a product life cycle management process such as a collaborative design process is human-centric in nature. A human-centric collaborative design process emphasizes the designer, and the design process as it effects the designer. Thus, such collaborative design process systems are not design data-centric and/or design process-centric. This makes human-centric monitoring extremely difficult to use in a distributed product development environment.

Existing design process management and display is generally performed at a single granularity level. Existing design process management and display in support of a decision support system is not capable of covering an integrated design process at all the granularities across multiple enterprises separated by one or more firewalls in an information network environment such as the Internet or World Wide Web. The latter problem remains true in cross-organizational design and development in a single company.

Generally, predetermined design processes and predetermined contents are what typically get handled by existing collaborative design process systems. Existing systems are not capable of automatically updating and reflecting, in near-real time, the dynamics of design partner's involvements and associated relationships. Such existing collaborative design process monitoring approaches emphasize the process (actions) of a design or the designer-based interface, as opposed to line-of-business needs (e.g., the availability of the bill of materials (BOM), the project schedule, etc.).

Therefore, a need exists for improved product life cycle management techniques.

SUMMARY OF THE INVENTION

The present invention provides improved product life cycle management over an information network and, more particularly, provides techniques for providing decision support activation and management in accordance with a product life cycle management process such as a collaborative design process. "Activation" generally refers to activating one or more decision support processes, while "management" generally refers to managing one or more decision support processes.

In one aspect of the invention, a technique for managing at least one collaborative process performed in accordance with a first entity and at least a second entity, comprises the following steps/operations. Information associated with the at least one collaborative process is obtained. Based on at least a portion of the obtained information, an information structure (e.g., a context pyramid) representative of the collaborative process is dynamically maintained so as to assist at least one of the first entity and the second entity in managing at least a portion of the collaborative process.

The technique may also comprise incorporating annotated business data into the information structure, incorporating annotated design data into the information structure, controlling data flow associated with the at least one collaborative process based on the information structure, and/or fetching one or more design data features for at least one of monitoring and tracking the at least one collaborative process. The collaborative process may be a business process. The collaborative process may be an engineering design process. The information structure may comprise a pyramid structure. The information structure may be multi-dimensional. The information structure may be multi-resolution. The obtained information may comprise annotated data. The obtained information may comprise user input.

Further, the step/operation of maintaining the information structure may further comprise updating one or more check points associated with the information structure, and/or calculating at least one energy level (e.g., frustration energy) associated with the information structure.

Still further, the technique may comprise analyzing at least one of the obtained information and the information structure, and generating one or more action representations based on the analyzing step/operation. The analyzing step/operation may be rule-based.

In another aspect of the invention, a technique for providing a service, in accordance with a service provider, to manage at least one collaborative process performed in accordance with a first entity and at least a second entity, comprises deploying a collaborative process management controller operative to: (i) obtain information associated with the at least one collaborative process; and (ii) based on at least a portion of the obtained information, dynamically maintain an information structure representative of the collaborative process so as to assist at least one of the first entity and the second entity in managing at least a portion of the collaborative process.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 8 through 15 are diagrams illustrating a timeline buffering determination based on a multi-resolution design process flow pyramid representation according to an embodiment of the present invention;

FIGS. 19A through 19E are diagrams illustrating construction of a context pyramid based on annotated data in an engineering design collaboration solution according to an embodiment of the invention; and FIG. 20 is a block diagram illustrating a hardware implementation of a computing system in accordance with which one or more components/methodologies of the present invention may be implemented according to an embodiment of the present invention.

DETAILED DESCRIPTION OF PREFERRED EMBODIMENTS

Figure 1:
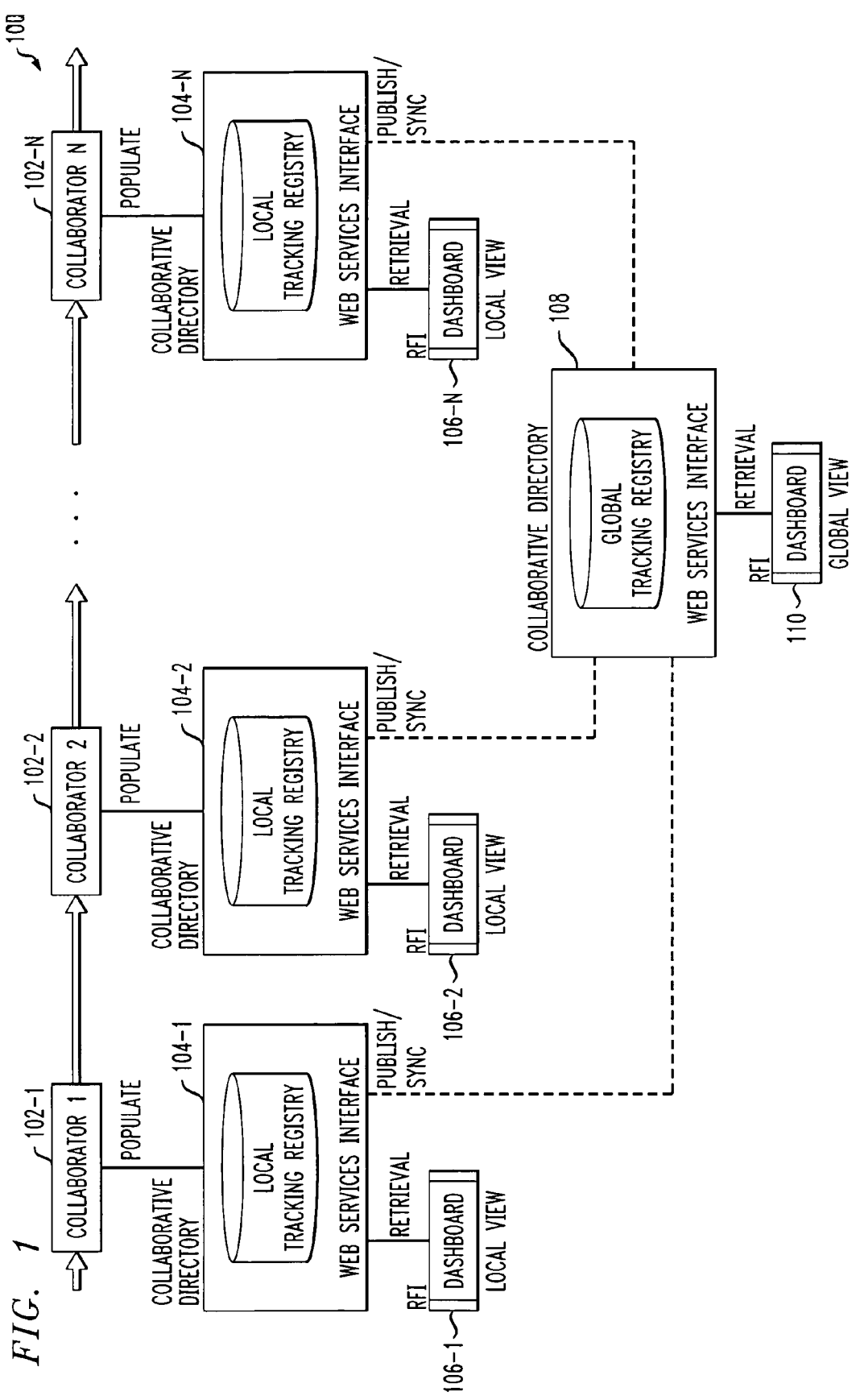
FIG. 1 is a block diagram illustrating a business-to-business (B2B) enabled environment in which the present invention may be implemented.

The following description will illustrate the invention using an exemplary engineering design collaboration application. It should be understood, however, that the invention is not limited to use with any particular application. Rather, the invention is more generally applicable to any application in which it is desirable to provide efficient and effective business process management techniques in a collaborative environment, e.g., B2B applications, etc.

More particularly, in the illustrative embodiments to be described below, the invention provides a decision support system for use in development cycles in a product life cycle management process. Some design goals of such a system include but are not limited to:

(i) activating, tracking and, monitoring collaborative development and design processes of a product involving multiple companies or organizations inside one company;

(ii) observing and controlling the related supply chain management collaboration activities in support of design and development of a product;

(iii) incorporating dynamics during the formation and dissolving of the collaborative team;

(iv) monitoring the design process status, design data status at any granularities, across all design and development partners, and across the individual participants; and (v) enabling efficient escalation activation and timely problem resolution of issues impacting the design and development processes and schedules of a product.

Further, the invention provides a design process monitoring approach based on annotated design data and design process data. An intelligent process is used to predict the likelihood of an event and this prediction can help the designer to make various decisions. The design process flow context is constructed automatically based on the annotated data that passes among designers. Thus, the invention provides control mechanism solutions for decision support activation and management in a product life cycle management process.

Still further, the invention provides a design collaboration pyramid mechanism that can automatically capture the dynamics of the design team formation and the design process progress, no matter how complex that might be. More particularly, the invention provides a concise representation of the status of the collaborative design dynamics. With the availability of autonomously-generated design process potential energy levels at any layer of the pyramid and any scale of the design process, effective control of the global and local design process (such as alerting, etc.) is realized and efficient monitoring of the local and global design tasks (such as design process monitoring, design file monitoring, and a lot more) is conducted.

Accordingly, as will be explained in illustrative detail below, the invention provides an autonomous computing-oriented control mechanism for use in a collaborative design, as well as in other business process control environments. Advantageously, the adaptive pyramid representation of the design team dynamics and design process dynamics provides an on-demand capability for business control and monitoring.

Referring initially to FIG. 1, a block diagram illustrates a business-to-business (B2B) enabled environment in which the present invention may be implemented. As shown, B2B-enabled environment 100 comprises collaborators 102-1 through 102-N, local collaborative directories 104-1 through 104-N, local dashboards 106-1 through 106-N, global collaborative directory 108 and global dashboard 110.

A collaborator (102-1, 102-2, . . . , 102-N) is a business entity that participates in the business collaboration process with one or more external business entities. A collaborative directory (local directories 104-1, 104-2, . . . , 104-N) stores the resources of the business collaboration (such as projects, tasks, users, organizations, documents, as well as annotations/meta-data) in a local tracking registry. A dashboard (local dashboards 106-1, 106-2, . . . , 106-N) is a graphical user interface (GUI) providing management and monitoring functions through which people interact with the collaboration resources stored in the collaborative directory.

The collaborative directory comprises web service utilities and a relational database or a plain Extensible Markup Language (XML) file for storing the collaborative data stream. At the same time, the collaborative directory provides web service utilities that are used to populate services for updating/publishing data and to monitor the status of the collaborative design processes, exchanged documents, and distributed project tasks, respectively.

Since the data with embedded status information (e.g., about a project, tasks, exchanged documents, etc.) is stored in multiple collaborative directories (104-1, 104-2, . . . , 104-N), the information from these distributed collaborative directories can be aggregated based on an access control policy carried in the annotation data. The collaborative directory 108 acts as the aggregator for the distributed collaborative directories. The temporal or aggregated results can be stored in the global tracking registry in the collaborative directory 108. Another deployment of the collaborative directory is to act as a hub where the hub manages collaborative resources of multiple organizations that use the hub as a central repository in support of collaboration activities.

Figure 2:
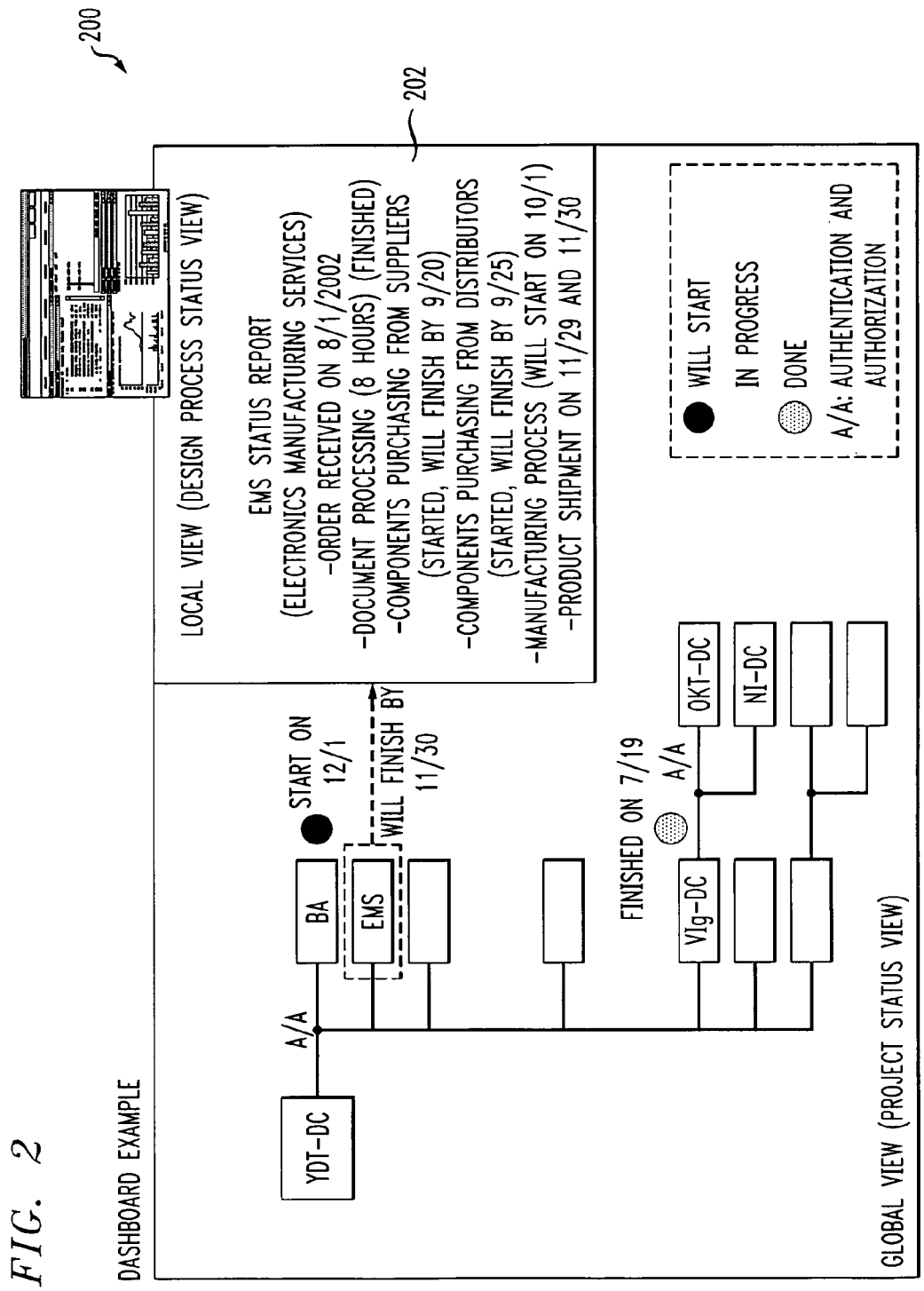
FIG. 2 is a diagram illustrating a user interface according to an embodiment of the present invention.

Referring now to FIG. 2, a diagram illustrates a user interface according to an embodiment of the present invention. More particularly, FIG. 2 is an example of a dashboard 200 that is used to show the status of the project. As explained above, a dashboard is a GUI providing management and monitoring functions through which people interact with the collaboration resources stored in the collaborative directory. The particular dashboard illustrated in FIG. 2 is a dashboard capable of showing a global view of the collaborative process (e.g., dashboard 110 of FIG. 1) and a local view of the collaborative process (e.g., dashboard 106 of FIG. 1).

Here, YDT-DC refers to a design center. BA, EMS, etc. refer to different partners (e.g., collaborators 102 of FIG. 1) involved in the design process. In association with each partner, there is a design schedule interface part 202 that gives various design process scheduling details. Interface part 202 may contain scheduling of the collaborator or the scheduling of tasks that the collaborator outsourced to other designers. Interface part 202 may also include the schedules of other designers.

Figure 3:
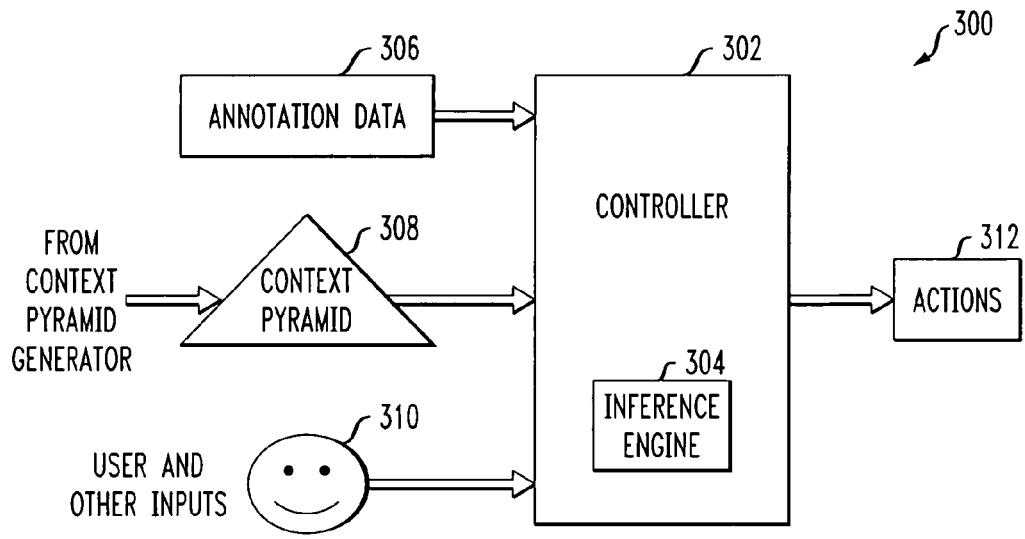
FIG. 3 is a diagram illustrating a logical composition and artifacts of an internal structure of a dashboard according to an embodiment of the present invention.

Referring now to FIG. 3, a diagram illustrates a logical composition and artifacts of an internal structure of a dashboard according to an embodiment of the present invention.

As shown, structure 300 comprises controller 302 with inference engine 304. Controller 302 receives inputs from outside sources and generates responses. Input to controller 302 can be annotation data 306 received from other designers. Input 310 can come from designers directly. A design process context pyramid 308 is also input by controller 302.

It is to be appreciated that a context pyramid may be initially generated by a context pyramid generator (not shown) which may be part of the dashboard internal structure, while controller 302 updates the pyramid as the design process progresses. Details of a context pyramid will be described below.

An example user and other input (310) may be a message such as: "Materials for the construction of the keyboard will not be ready by tomorrow." The annotation data could be any XML-based representation or other formats. While the invention is not limited to any particular annotation data format, in one embodiment, the annotation data may be in the form disclosed in the U.S. patent application identified by Ser. No. 10/665,699, filed on Sep. 19, 2003, and entitled "Methods and Apparatus for Information Hyperchain Management for On-Demand Business Collaboration," the disclosure of which is incorporated by reference herein.

Below is an example of annotation data in the form of an activity design file. The information may include the following: design requirements, design configuration/specifications, the designed files, and tools, etc.

Based on these inputs, by checking the design process context pyramid, inference engine 304 performs (or causes the performance of) some actions 312, such as alerting the current designer it represents, sending reminders to other designers, modifying the content of the context pyramid because of a change in check points, etc.

It is to be appreciated that inference engine 304 may be constructed in a variety of ways. One illustrative way is to use a rule-based system for automated control. The left hand side of a rule may be a combination of inputs (e.g., annotated data, context pyramid, user instructions, and possibly other inputs). The right hand side of a rule may be the actions to take based on the inputs. Actions may include but are not limited to disseminating data to different sources, modifying the collaboration directory, displaying some alert information on the dashboard (such as a message that the project is late, etc.), automatically annotating the design process, suggesting appropriate actions for the user (such as transforming a file format, etc.). By way of example only, the rule-based system described in G. Fisher et al., "Adding Rule Based Reasoning to a Demonstrational Interface Builder," Proceedings of UIST 92, pp. 89-97, November 1992, the disclosure of which is incorporated by reference herein, may be employed to implement the inference engine.

Figure 4:
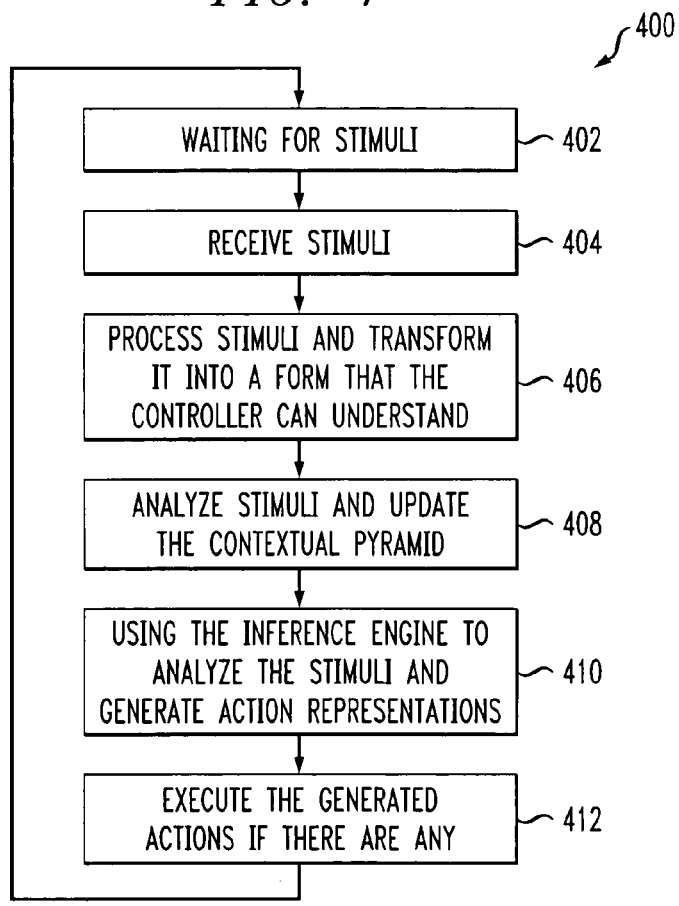
FIG. 4 is a flow diagram illustrating a methodology performed in accordance with a controller according to an embodiment of the present invention.

Referring now to FIG. 4, a flow diagram illustrates a methodology performed in accordance with controller (e.g., controller 302 and inference engine 304 of FIG. 3) according to an embodiment of the present invention. More specifically, FIG. 4 shows a working flow 400 of the controller (inference engine).

As shown, in step 402, the controller waits for any possible stimuli to come, e.g., annotation data (306 of FIG. 3), user or other inputs (310 of FIG. 3). When stimuli is received (step 404), the controller first transforms (step 406) the stimuli into a form that it can understand. In step 408, the controller then analyzes the stimuli and updates a context pyramid, if necessary. In step 410, the controller analyzes the stimuli and generates possible action representations (in accordance with the inference engine). If there are any actions to be executed, the controller executes the actions, in step 412.

Figure 5:
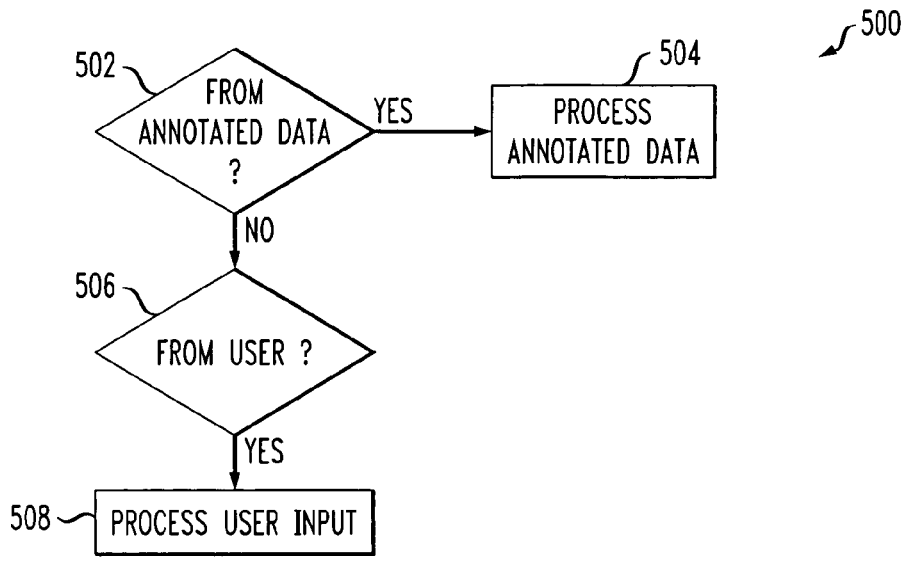
FIG. 5 is a flow diagram illustrating a methodology for processing stimuli according to an embodiment of the present invention.

Referring now to FIG. 5, a flow diagram illustrates a methodology for processing stimuli according to an embodiment of the present invention. More particularly, methodology 500 may be considered an illustration of step 406 of FIG. 4.

---

<cbpm:DesignFilerdf:about="HYPERLINK
"Http://www.ni-dc.com/AmpSubMinDconn9PosRearPanelMtg.CATPart"http://www.
ni-dc.com/AmpSubMinDconn9PosRearPanelMtg.CATPart"
<cbpm:fileName> Amp Sub Min D conn 9 Pos Front Panel Mtg.CATPart
</cbpm:fileName>
<cbpm:fileSize> 239K bytes </cbpm:fileSize>
<cbpm:lastModifiedTime>9/25/2002, 6:00PM </cbpm:lastModifiedTime>
<cbpm:lastVersionNumner> V5.1 </cbpm:lastVersionNumner>
<cbpm:location> HYPERLINK
"ftp://ftp.ni-dc.com/dc/designfile/AmpSubMinDconn9PosRearPanelMtg.CATPart"ftp://
ftp.ni-dc.com/dc/designfile/AmpSubMinDconn9PosRearPanelMtg.CATPart
</cbpm:location>
<cbpm:designTool> CATIA V5 </cbpm:designTool>
<cbpm:format> CATPart </cbpm:format>
<cbpm:designPartnerID> ABC </cbpm:designPartnerID>
<cbpm:designProjectID> NoteBookT61 </cbpm:designProjectID>
<cbpm:accessControl>
. . . . . .
</cbpm:accessControl>
</cbpm:Specification>

As shown, the controller determines if the stimuli is annotated data (step 502) and, if so, the data is processed (step 504), e.g., transformed to a format understood by the controller. The controller also determines if the stimuli is user input (step 506) and, if so, the user input is processed (step 508). For example, if a user inputs that "materials for the construction of the keyboard will not be ready by tomorrow," and if the system thought that the materials would be available by tomorrow, then the engine automatically updates the context pyramid.

Figure 6:
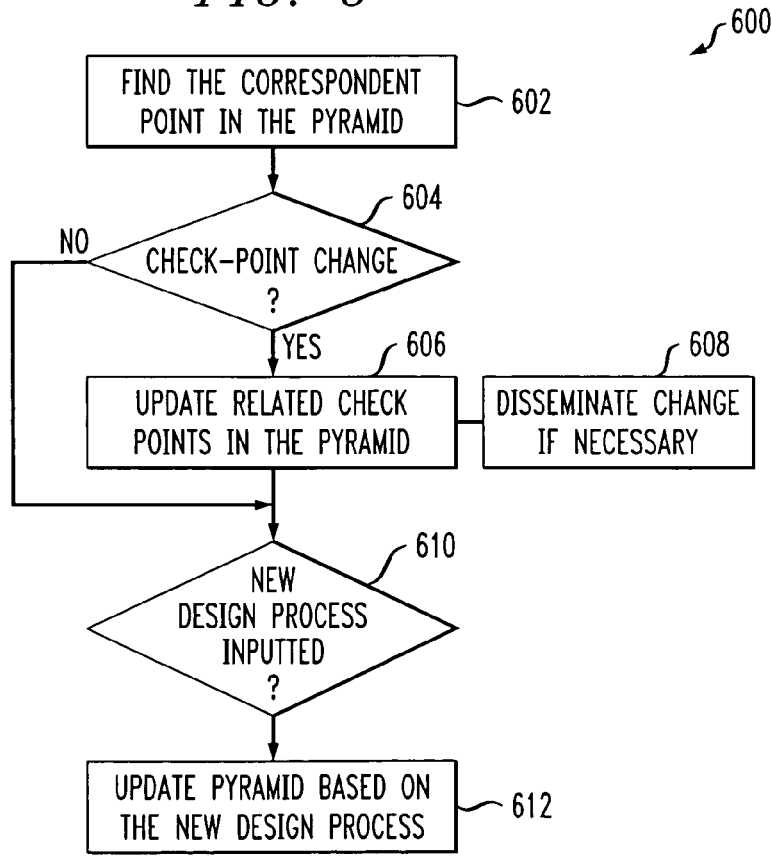
FIG. 6 is a flow diagram illustrating a methodology for analyzing stimuli and updating a context pyramid according to an embodiment of the present invention.

Referring now to FIG. 6, a flow diagram illustrates a methodology for analyzing stimuli and updating a context pyramid according to an embodiment of the present invention. More particularly, methodology 600 may be considered an illustration of step 408 of FIG. 4.

Based on the received stimuli, the controller first searches the correspondent point in the pyramid to which this new information corresponds (step 602). The controller then checks whether the check point has changed (step 604). If so, the controller updates (step 606) the related check point and propagates the changes to other parts of the pyramid. If the propagation will influence other designers, the controller generates annotated data, packages the data, and disseminates the data to other design partners (step 608). If a new design process is inputted (step 610), the controller updates the pyramid based on the new design process by merging the process into the pyramid (step 612).

Figure 7:
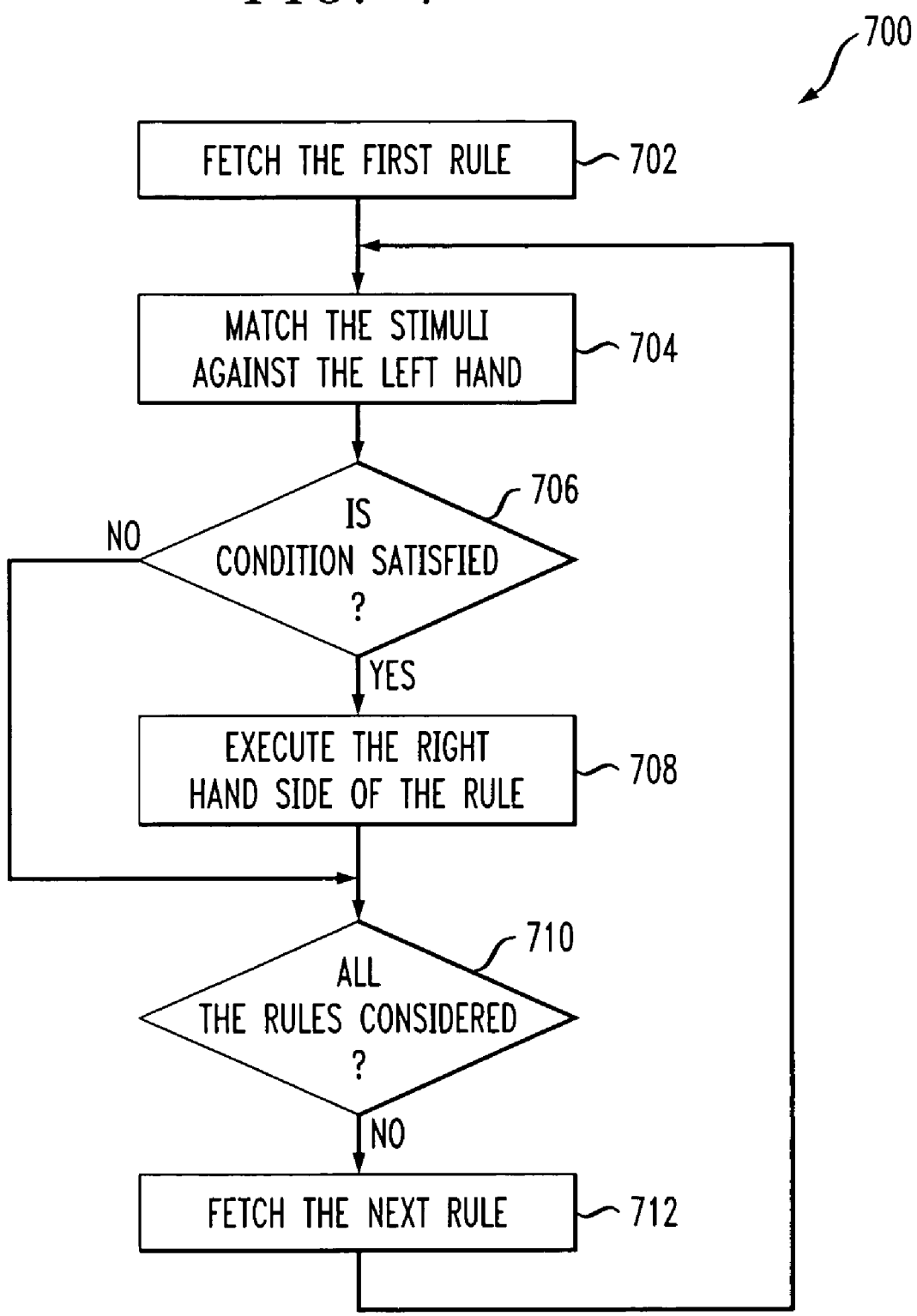
FIG. 7 is a flow diagram illustrating a methodology for using new stimuli to generate corresponding action representations according to an embodiment of the present invention.

Referring now to FIG. 7, a flow diagram illustrates a methodology for using new stimuli to generate corresponding action representations according to an embodiment of the present invention. More particularly, methodology 700 may be considered an illustration of step 412 of FIG. 4.

As shown, in step 702, the inference engine fetches the first rule. In step 704, the received stimuli is compared against the left hand side of the fetched rule. If the received stimuli matches the left hand side of the fetched rule (condition satisfied in step 706), then the right hand side of the fetched rule is executed (step 708). If all rules have not been considered (step 710), the next rule is fetched (step 712) and the methodology is repeated. Also, if the condition of a rule being considered is not satisfied, and there is at least one more rule to consider, the next rule is fetched.

It is to be appreciated that the inference engine can be realized in a variety of forms. One form is a rule-based inference engine. The following is an example of a rule that may be employed:

If [(task="VLSI for CPU design") && (timeleft="5 days") && (DesignAccomplished=50%) && (TotalTimeForDesign="55 days")], then AlertTheDesigner.

The "if" portion of the rule (left hand side) is the condition(s) to be satisfied, and the "then" portion of the rule (right hand side) is the action to be taken when the condition(s) is satisfied. Such rules may be generated and stored for subsequent fetching for consideration during operation of the inference engine in response to received stimuli.

Referring now to FIGS. 8 through 15, a timeline buffering determination based on a multi-resolution design process flow pyramid (MRDPFP) representation is illustrated according to an embodiment of the present invention. That is, FIGS. 8 through 15 illustrate context pyramid representations.

It is to be appreciated that the pyramid is generated (and updated) dynamically during the process. A "check point" is the point that project status is checked.

In this embodiment, design process monitoring is realized using an absolute project timeline which provides check points for the business process of the whole design process. This may come from the originator of the design process (e.g., the design center). We call it the i-th level design project timeline. We define this timeline as a workflow, with expected check points added between different nodes.

FIG. 8 shows a process when no parallel process exists. $C_{1,i}$ refers to the i-th check point at the crudest level of the timeline. $T(C_{1,i}; C_{1,i+1})$ gives the expected time that is needed from check point i to check point i+1. This time can be obtained with check points $T(C_{1,i}; C_{1,i+1}) = C_{1,i+1} - C_{1,i}$. This time is the buffer for the check point $C_{1,i}$.

However, $T(C_{1,i}; C_{1,i+1})$ is only the expected time for the check point state transition. Suppose that the real time used to transit from $C_{1,i}$ to $C_{1,i+1}$ is $t(C_{1,i}; C_{1,i+1})$, then the rest of the check points need to be updated as:

$$C_{1,j} \leftarrow C_{1,j} + \lfloor t(C_{1,i}; C_{1,i+1}) - T(C_{1,i}; C_{1,i+1}) \rfloor$$

So, when the real situations change, the check points will change accordingly.

FIG. 9 shows a situation for a more detailed project flow added to the system. Now, during the dissemination of the design tasks, more details will be added to the original design process workflow. This input may come from the annotated data. It may also come from the user.

For example, if a designer is responsible for the transition from $C_{1,1}$ to $C_{1,2}$, then this designer might separate this single process into several processes, or even outsource some part to other designers. So, a second level of the design process flow exists. This is shown in FIG. 9.

This is a higher level resolution (i.e., granularity) workflow, compared to the previous one. Suppose the next designer separates the flow into five check points. The first and the last check points are the same as the $C_{1,1}$ and $C_{1,2}$. The check point update process is the same as what was described above in the context of FIG. 8. Suppose that $C_{2,5}$ is the real check point after an update, then $C_{1,2}$ will also be updated accordingly.

Figure 10:
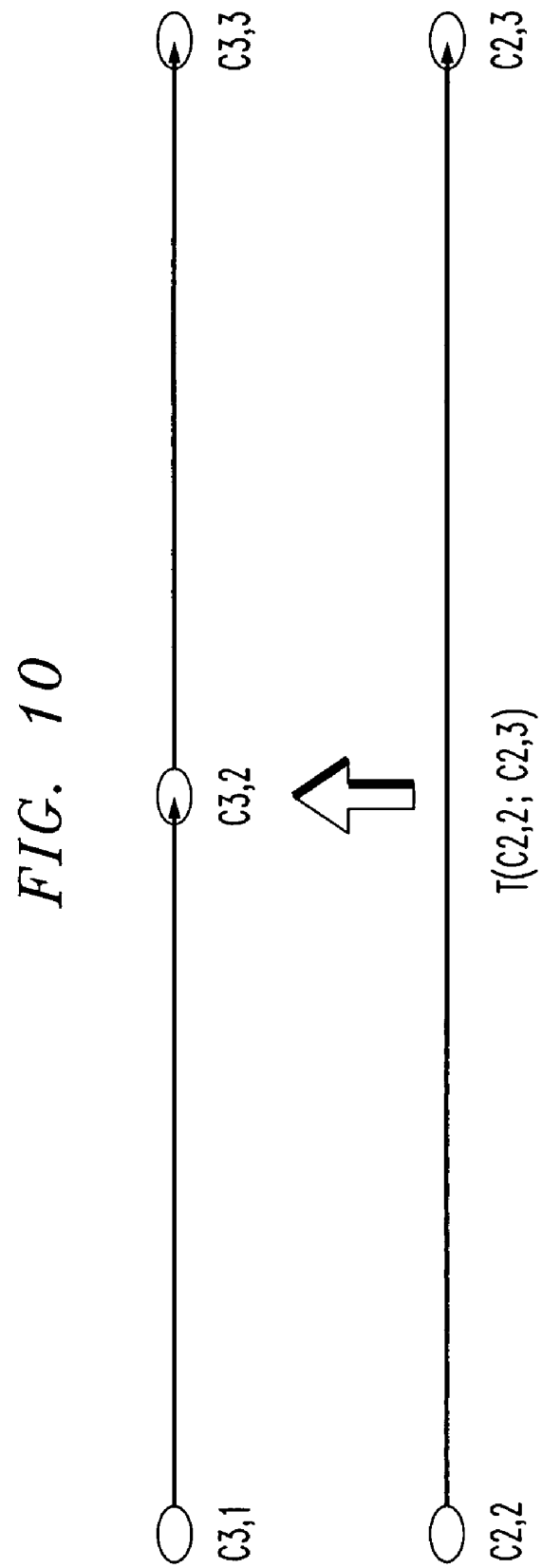

FIG. 10 shows another level of the design process that is added to the system. For any pair of consecutive check points, such as $C_{2,2}$ and $C_{2,3}$, we may have another level of resolution of the design process workflow. Now, again, the value of $C_{2,3}$ will be updated if the value of $C_{3,3}$ will be updated.

Figure 11:
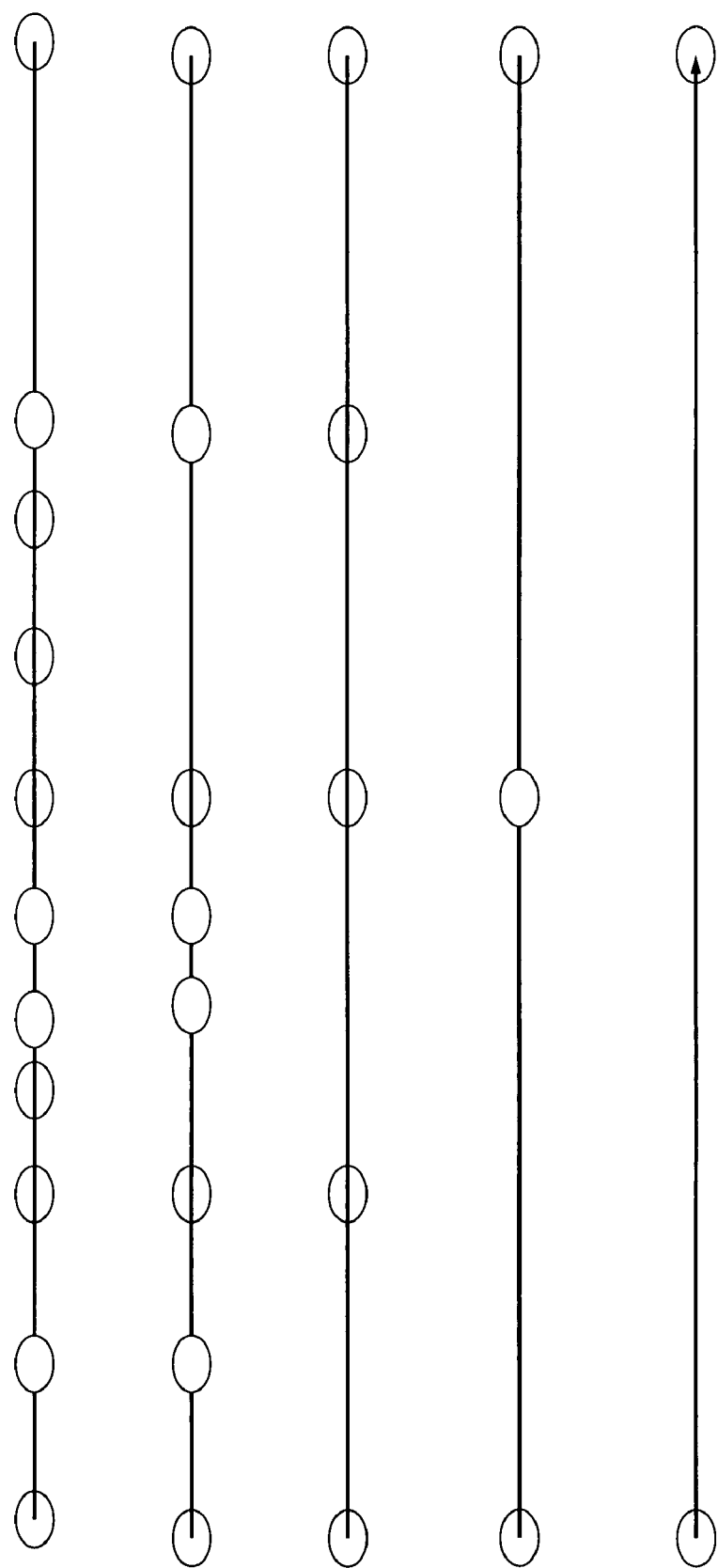

FIG. 11 provides a global view of the process pyramid that is constructed during the design process. Please note that the construction of the design flow comes from the annotated data, plus some user input.

Figure 12:
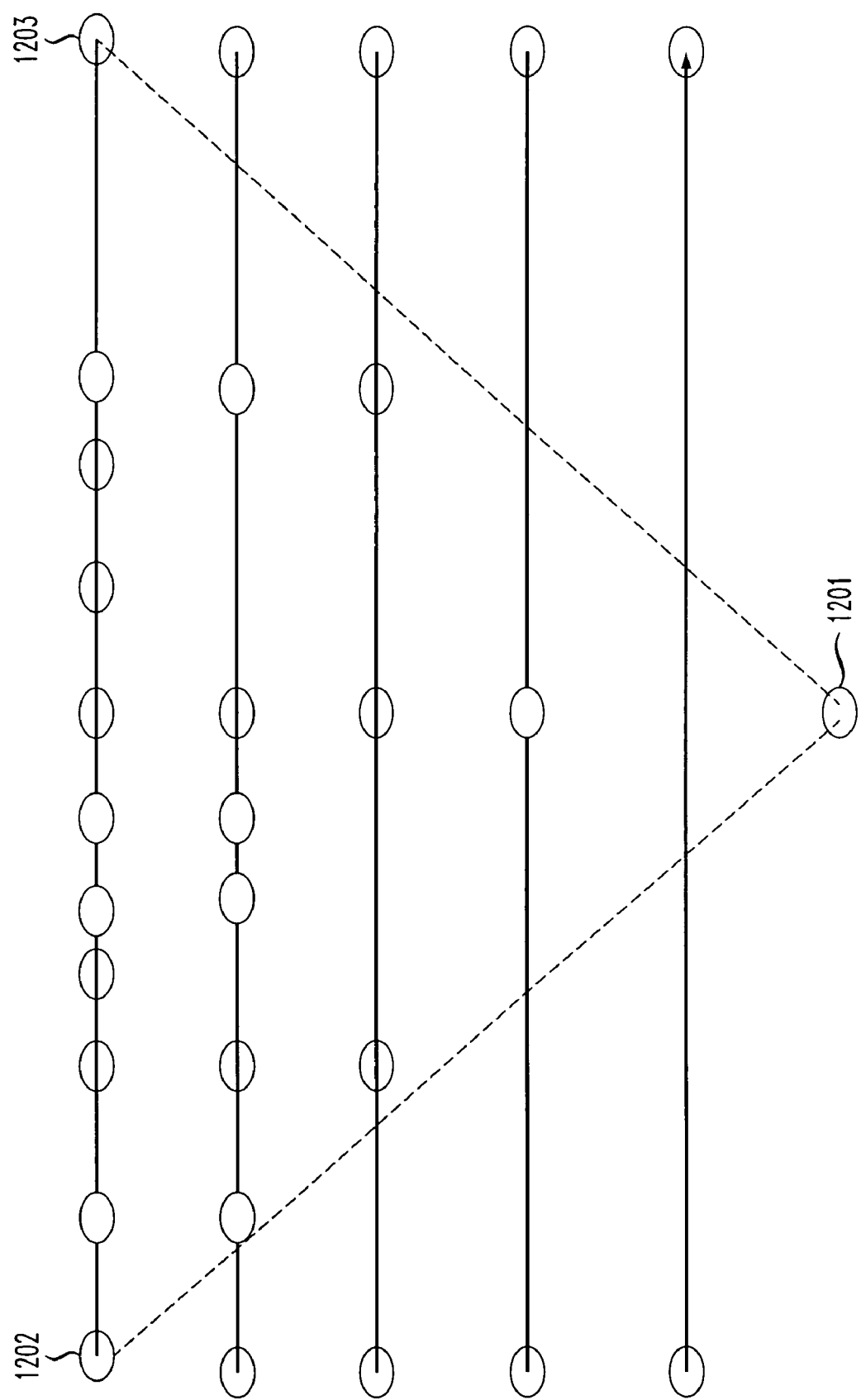
Figure 13:
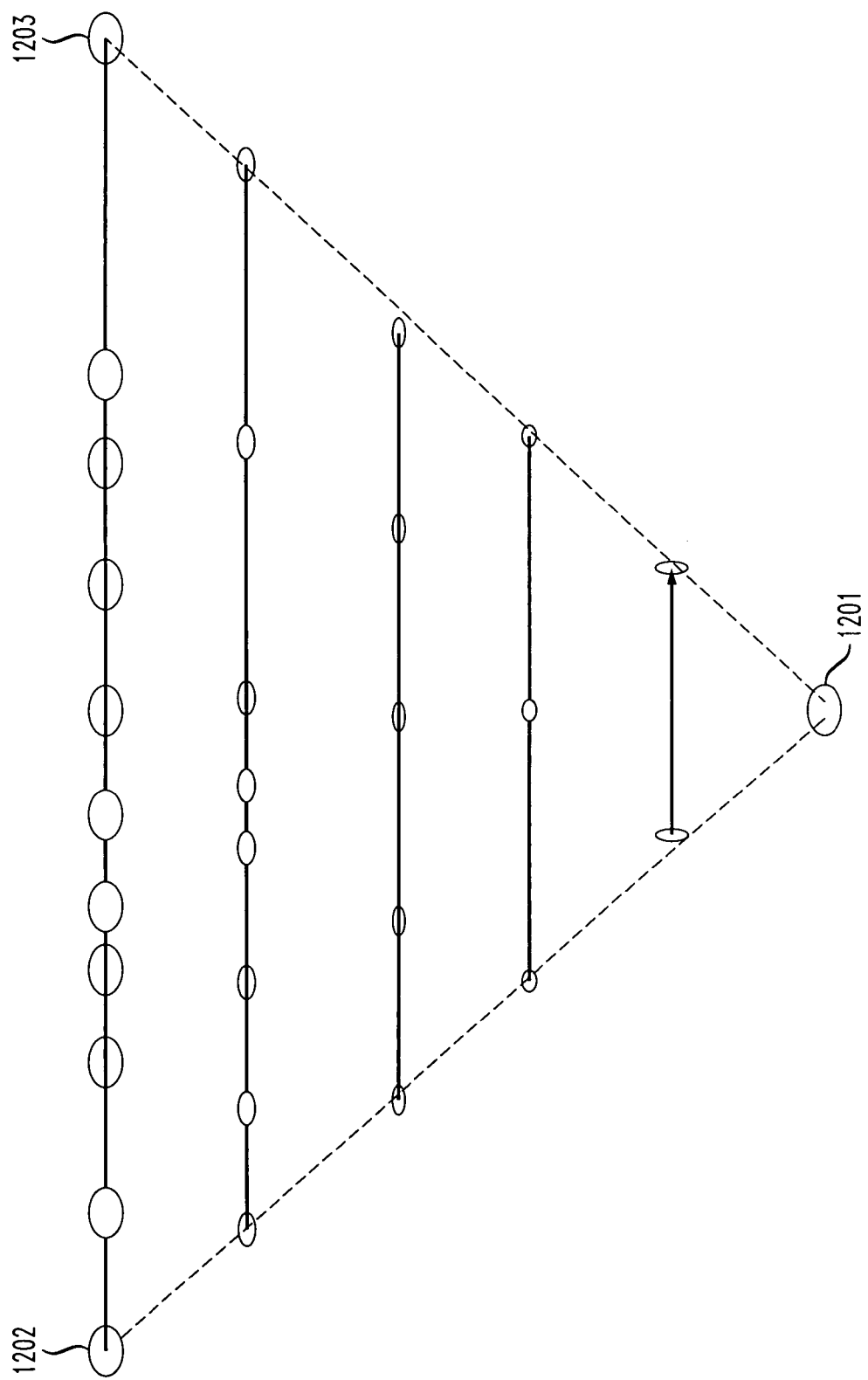

FIGS. 12 and 13 show the design process flow pyramid. It can be noticed that on the project line, the resolution becomes higher and higher when more and more designers are involved (because they will input via a business-to-business integration platform such as IBM Corporation's Web-Sphere® Business Integration Connection with annotated data about their check points). This is one of the types of information that the dashboard monitor displays. ("Web-Sphere" is a registered trademark of International Business Machines Corporation in the United States, other countries, or both.)

As shown in FIGS. 12 and 13, if a virtual node (1201) is added at the lowest level to refer to the beginning of the design process (when no one is involved), the virtual node is connected with the two end nodes at the highest resolution (1202 and 1203), and the flow lines are compressed (as shown in FIG. 13), the pyramid is obtained.

Thus, FIG. 13 shows a design process flow pyramid (i.e., context pyramid). The pyramid contains the information about the design process. The pyramid may be one of the windows in the dashboard that shows the global project status (e.g., see FIG. 2). The pyramid provides for total monitoring of the project progress.

Figure 14:
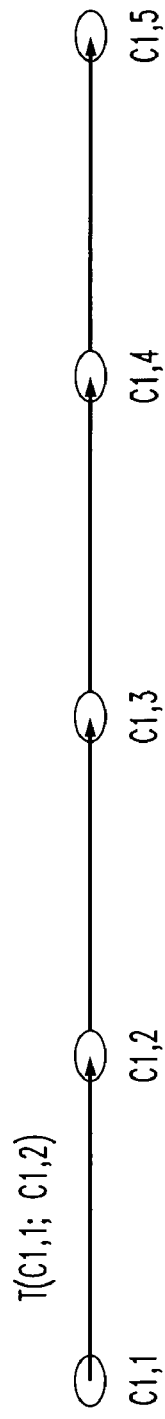

FIG. 14 depicts the concept of design project process buffering which is used to show the progress of the design process. The project check point buffer can be calculated as described above and thus can be used by the designer in control and planning of the designer's own actions. The buffer here refers to the time that is available for the current project to finish. If the time exceeds the allocated time for a given project, the buffer overflows.

As illustrated above, the project check points keep updating as the project progresses. However, usually the initial check point is very important since it gives the original plan of the project, or, in other words, the absolute timeline. This absolute timeline exists at all different levels of the resolutions. When a real check point passes the absolute timeline, it gives other check points some urgency because others have to shorten their planned time so as to meet the absolute check points. This urgency is modeled as a potential energy which may be displayed at the dashboard so that the users can get a sense on whether they should speed-up to meet the absolute check point. These energies can also be used to evaluate the performance of the designers.

In FIG. 14, suppose that $C^*_{1,i}$ are the absolute check points, and $C_{1,i}$ are the real check points at time t. Then, for each check point, its energy (referred to below as "frustration energy") is calculated as:

$$\text{sign}(C_{1,i} - C^*_{1,i}) \times \frac{1}{2} \times (C_{1,i} - C^*_{1,i})^2$$

Different colors may be used to represent the energy. Thus, a colored pyramid can be displayed at the dashboard. This can be one way to represent the project progress.

Figure 15:
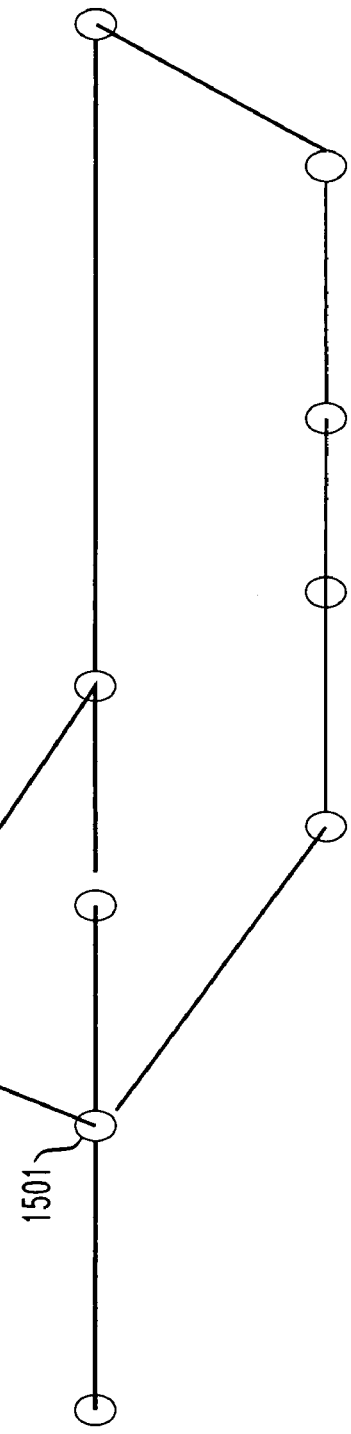

FIG. 15 shows a situation where design projects can proceed in parallel. It is obvious that parallel processes often exist during a design process. For example, the design of a computer notebook device can be separated into the design of mechanical parts and electrical parts. The two sets of parts will not influence each other, and thus the internal check points of the two sets will not influence each other.

In FIG. 15, there are three parallel processes that branch out from the second node (1501) of the main design flow. At the point of the branching, the designer should specify the main branch among the three branches. This main branch will be acted as the main references for all the other branches. Check points of this branch are the main reference check point for all the offspring branches. At any main check points, if there is a branch that is ending here, then the new check point status will be updated with the latest check point among all the check points ending here.

The specification of branches can be realized by analyzing the annotation data or the user can directly input via a user interface. Only the main branch will be used to construct the pyramid. All the other non-main branches will not be used there. However, all the branches can be navigated. Please note that the design process context pyramid may be generated on the fly.

Figure 16:
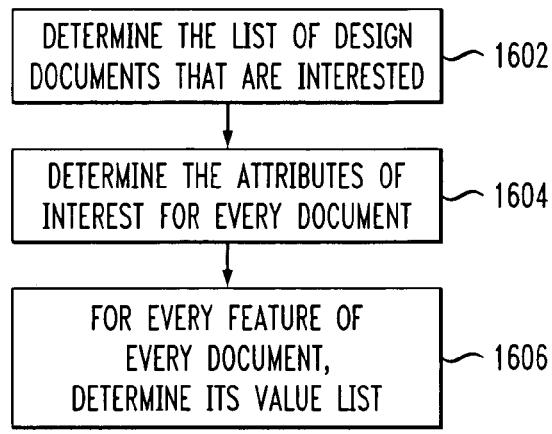
FIG. 16 is a flow diagram illustrating a methodology for each designer to take, in accordance with a design system, before the design collaboration process according to an embodiment of the present invention.

Referring now to FIG. 16, a flow diagram illustrates a methodology 1600 for each designer to take in accordance with the design system before the design collaboration process, according to an embodiment of the present invention.

In step 1602, the designer first determines the list of design documents that it he/she is interested in. These can include but are not limited to any documents that exist during the design process, e.g., hardware build data, VLSI data, mask house data, test data, and many more.

For each category of document, in step 1604, the designer then determines what are the attributes of interest for the document. These attributes may include the initial author of the document, versions of the document, is it currently being locked and modified and by whom, is the document final, etc.

In step 1606, the designer then determines the value list of each document attribute. For example, the value list may give as the "initial author," the name of the author who authored the document. The list may also give some potential values for the author, if the author is not known. The list may simply leave the value blank if it is not known.

Figure 17:
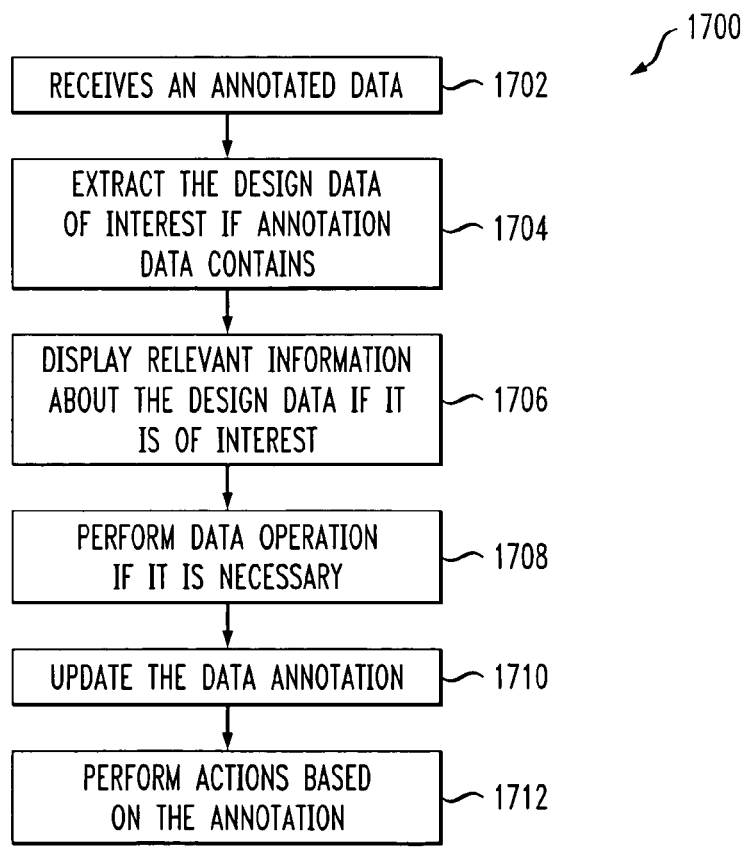
FIG. 17 is a flow diagram illustrating a methodology for design data tracking and document handling during a design process according to an embodiment of the present invention.

Referring now to FIG. 17, a flow diagram illustrates a methodology 1700 for design data tracking and document handling during a design process, according to an embodiment of the present invention.

When an annotation is passed to the current designer, the designer receives the data (step 1702). Examples of annotations are file name, file type, version, author name, etc. In addition, annotations can also be used to specify "actions" to be performed on the documents. Examples of such actions may be "review" document, perform "RFTP" (reliable file transfer) and send actions to legacy applications like Enterprise Resource Planning (ERP) and PDM, etc. The annotations in the received messages are forwarded to controller 302 shown in FIG. 3, which is an integration layer to back-end legacy applications as well as components like RFTP. Controller 302 invokes the proper actions on the documents.

By analyzing the annotation, controller (302 of FIG. 3) checks whether there is design data in which the user is interested. The controller then extracts (step 1704) the design data and its own annotations. These annotations may include the author of the data, the version, who can view/modify the data, and more. The controller presents a user interface to the designer asking him whether he might be interested in checking the status of the data. If so, the relevant information is displayed via the dashboard (step 1706).

If the designer needs to operate on the data (step 1708), he gets the data using a file transfer protocol (FTP) method. Then, the designer makes modifications on the data. After this, he updates the data annotation (step 1710). This may include many of the values of the attributes of the data. It also may include the dissemination list, if a dissemination of the data is necessary. This newly annotated data is processed by the controller, and actions taken based on the annotation (step 1712).

Figure 18A:
FIGS. 18A through 18C are diagrams illustrating an interface for design data status tracking initiated by a designer according to an embodiment of the present invention.
Figure 18B:
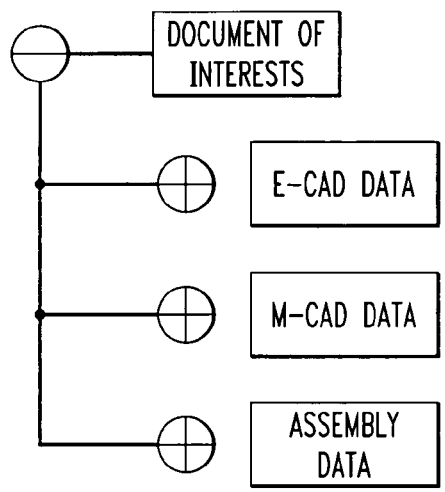
Figure 18C:
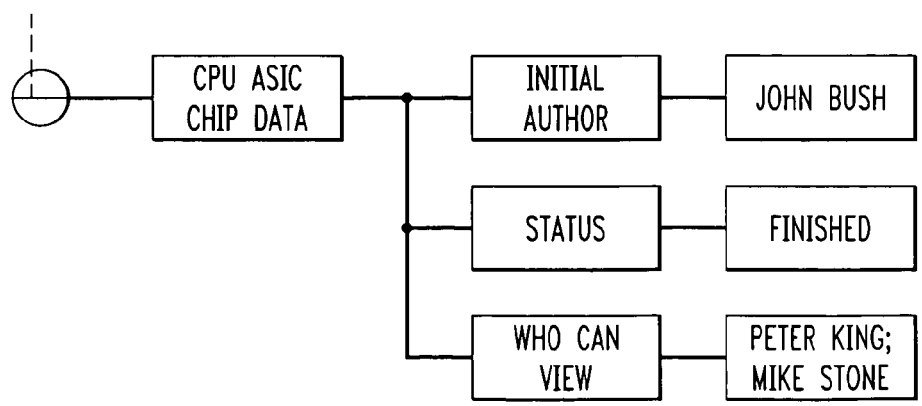

FIGS. 18A through 18C show an interface for design data status tracking initiated by a designer, according to an embodiment of the present invention.

More particularly, FIG. 18A shows the highest level of the design data monitor user interface. It occupies a part of the dashboard. The plus sign "+" embedded within a circle means that the item can be further spread. When the user wants to view the status of design document of interest, he will usually need to spread the document hierarchy one by one until the intended document is found.

FIG. 18B shows a half spread document hierarchy. The "−" sign embedded within a circle means that the given item is fully spreaded.

FIG. 18C shows an example of a status of a "CPU ASIC chip Data".

In general, when the user clicks a document such as "CPU ASIC chip Data," the controller searches the collaborative directory (104 or 108 of FIG. 1) for the link of this document. This link points to a web address that stores the data. The controller then fetches the related information and displays it on the data area of the dashboard.

FIGS. 19A through 19E illustratively explain the construction of a context pyramid based on annotated data in an engineering design collaboration solution.

Figure 19A:
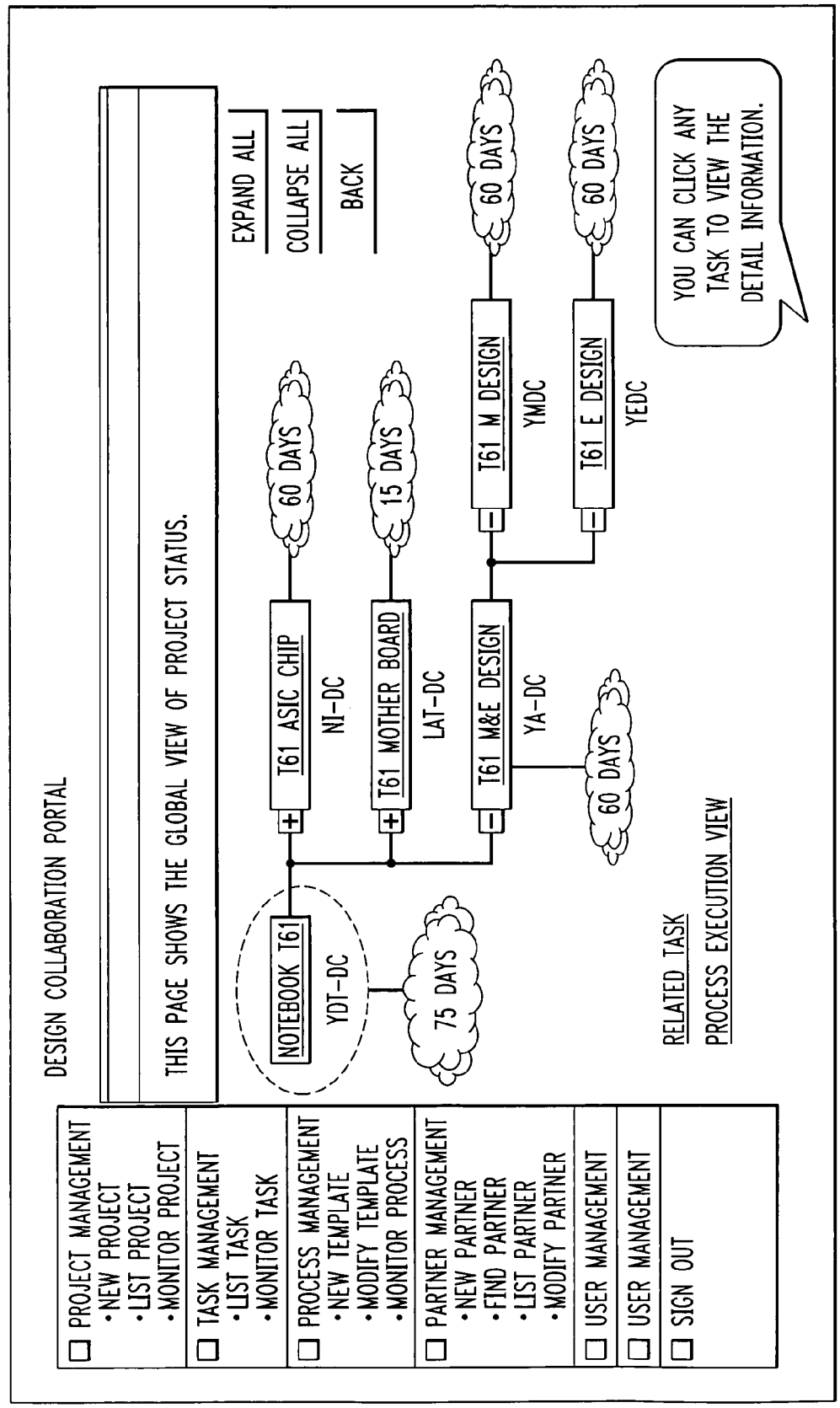

FIG. 19A shows an exemplary design collaboration portal. The design collaboration portal depicts what component(s) needs to be designed and how many days are needed to design the component(s).

Figure 19B:
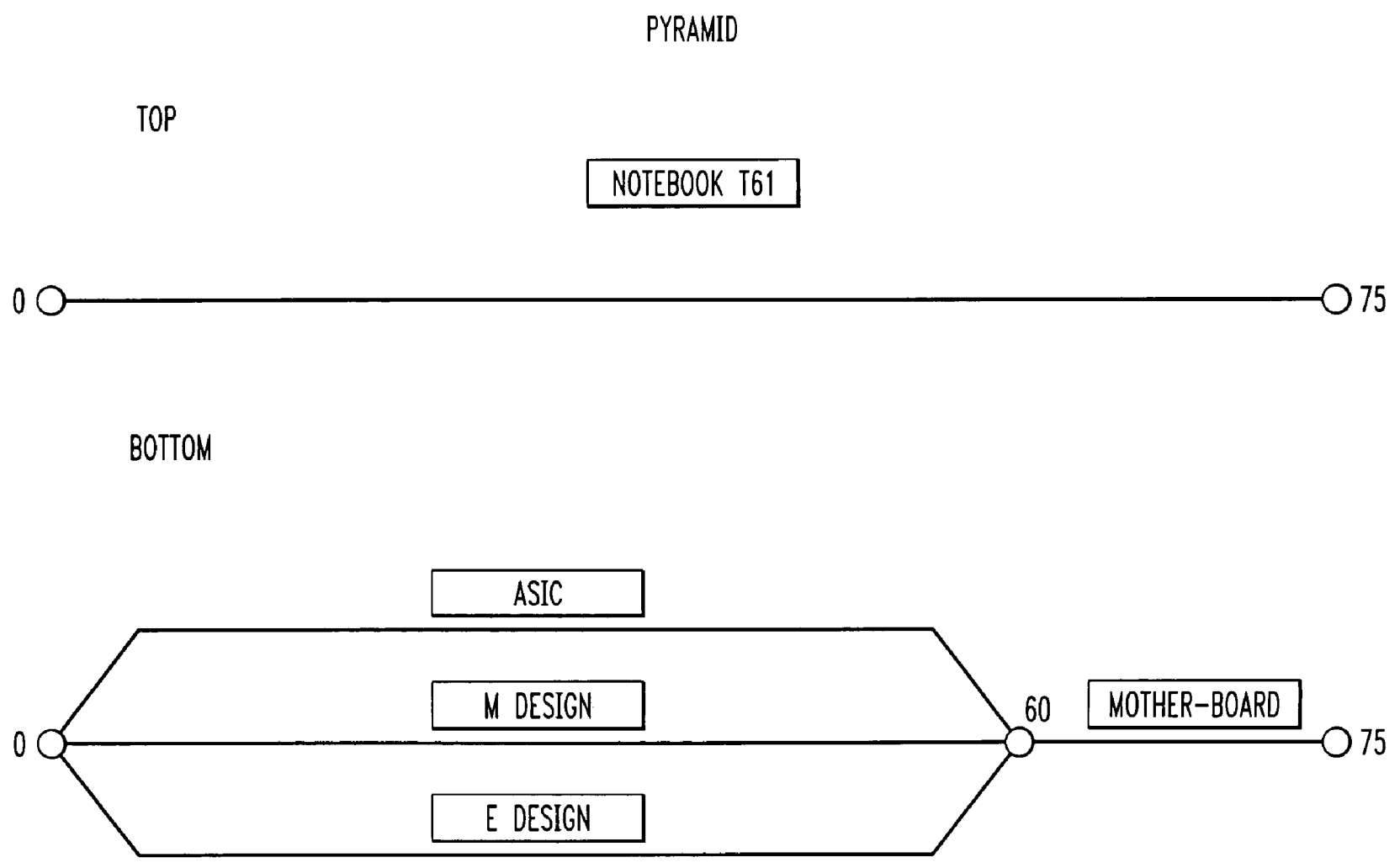

FIG. 19B (Top) shows the initial pyramid which captures the global task of FIG. 19A, i.e., design a notebook computer. FIG. 19B (Bottom) shows the bottom of the pyramid which has three parallel projects ASIC (application-specific integrated circuit), Mdesign (mechanical design), Edesign (electronic design) and another serial project which is to design the board. For example, the design a notebook requires 75 days. The design of the ASIC, MDesign, and EDesign can be in parallel, and they all need 60 days. However, the design of the motherboard needs to wait for the other projects to be completed.

FIG. 19C shows how to calculate the offset for each task as time progresses. Here $T_{M\_Design}$ is the elapsed time for the $M\_Design$. $T_{E\_Design}$ is the time elapsed for the $E\_Design$. $T_{ASIC}$ is the time elapsed for the ASIC design. $T_{Board}$ is the time elapsed for the board design. The calculation of various offsets may be according to the example of FIG. 19C. For example, if the $T_{M\ Design}$ is 10, the offset is calculated as: 10−60=−50. That is, there are 50 more days left to complete the electronic design.

FIG. 19D shows how to perform check point calculation. For example, if $T_{MDesign}$ is 10, then the check point calculation will be 10−60+60=10.

FIG. 19E shows how to calculate the frustration energy. For example, if $T_{MDesign}$ is 10, then the energy is calculated by: $0.5*\text{Sign}(10-60)*K*(10-60)^2 = -1250*K$. K is the constant set by the user. K reflects the importance of the process. For example, if K=1, then the above value will be −1250.

Referring finally to FIG. 20, a block diagram illustrates an illustrative hardware implementation of a computing system in accordance with which one or more components/methodologies of the present invention (e.g., components/methodologies described in the context of FIGS. 1 through 19E) may be implemented, according to an embodiment of the present invention. For instance, such a computing system in FIG. 20 may implement a dashboard, a collaborative directory, a controller, an inference engine, etc. Also, the computing system in FIG. 20 may be used to generate and/or update a context pyramid according to the present invention.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, computer system 2000 may be implemented in accordance with a processor 2002, a memory 2004, I/O devices 2006, and a network interface 2008, coupled via a computer bus 2010 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. Such output devices may also be used to present graphical user interfaces such as those described herein and, in particular, that shown in FIG. 2.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly, as described herein in detail, the present invention provides an autonomous design process flow construction methodology in the form of a pyramid structure. The techniques support display and design support activation functions. The pyramid construct captures multi-dimensional, variable-granularity critical process check points. The invention provides for annotation data-enabled autonomous pyramid growth and re-configuration in support of display and design support activation functions. The invention provides automatic adjustment of notification and alert activities (e.g., block 412 of FIG. 4) based on a frustration energy calculation. Further, the invention provides frustration energy models and captures various levels of dependency urgency management needs for project execution check points. Still further, check points may be dynamically updated and propagated based on real execution status of the projects involved in a design and development of a product.

Furthermore, as described herein in detail, the invention provides techniques for monitoring, scheduling, and controlling both inter-enterprise and intra-enterprise distributed design processes. The invention provides a compact representation of a business process at different granularity using a context pyramid which enables; (i) techniques for transforming/incorporating annotated business data into the pyramid; (ii) techniques for transforming/incorporating annotated design data into the pyramid; (iii) techniques for controlling the design process based on stimuli and the context pyramid; (iv) techniques for controlling data flow based on stimuli and the pyramid; and (v) techniques for fetching design data features for monitoring and tracking.

The invention also provides techniques for monitoring design process activities and providing alerts to the designer that enable methods and apparatus for adaptive monitoring and control for design collaboration using a self-generating design process pyramid and frustration energy at all design process levels and design data granularities among design partners.

The invention also provides a multi-dimensional vector (e.g., in the form of an information structure such as a context pyramid structure) representing collaborative design processes, at the whole collaborative design life cycle, that are non-deterministic. The representation uniquely captures the processes, stored in distributed elements of a design collaboration grid. Furthermore, the pyramid is an autonomic data structure that is self-healing, self-managing and self-recovering. "Self-healing" refers to the feature that when one point in the design process does not work as expected, the information is spread to other parts of the pyramid, so that appropriate actions can be taken. "Self-managing" refers to the pyramid managing its data by itself. "Self-recovering" refers to the feature that proper actions can be taken when there are delays in certain parts of the projects. The pyramid is also adaptive to changes, independent to specific changes, and data content may be generated on demand across the product life-cycle.

The invention also provides a technique for providing a service, in accordance with a service provider, to manage one or more collaborative processes performed in accordance with multiple entities. The service method comprises the service provider deploying a collaborative process management controller operative to: (i) obtain information associated with the one or more collaborative processes; and (ii) based on at least a portion of the obtained information, dynamically maintain a context pyramid representative of the collaborative process so as to assist the entities in managing at least a portion of the collaborative process.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of managing a collaborative process performed in accordance with a first entity and at least a second entity, the method comprising:
   a computer obtaining information associated with the collaborative process used to design and develop a given product; and
   based on at least a portion of the obtained information, the computer dynamically building and maintaining an information structure as a context pyramid structure to assist at least one of the first entity and the second entity in managing at least a portion of the collaborative process;
   wherein the context pyramid structure represents a status of the collaborative process and comprises a plurality of flow lines that represent a plurality of levels of resolution of tasks in the collaborative process; and
   wherein the building and maintaining comprises:
      creating a lowest-level flow line to represent a lowest-level of resolution, the lowest-level flow line corresponding to a timeline for completing the collaborative process, the timeline containing a plurality of checkpoints for completing the collaborative process, each of the checkpoints represented on the lowest-level flow line by a node, the nodes comprising at least a starting node representing a starting checkpoint on the timeline and an ending node representing an ending checkpoint on the timeline; and
      iteratively creating at least one next-higher level flow line to represent a next-higher level of resolution from a next-lower level flow line, for at least one pair of consecutive nodes on the flow line of the next-lower level, the next-higher level flow line corresponding to a next-higher-resolution timeline containing a plurality of higher-resolution checkpoints for completing a portion of the collaborative process that occurs between the checkpoints represented by the consecutive nodes on the lower-level flow line, each of the higher-resolution checkpoints represented on the next-higher level flow line by a node, the nodes on the next-higher level flow line comprising at least a starting node representing a starting checkpoint on the next-higher-resolution timeline and an ending node representing an ending checkpoint on the next-higher-resolution timeline.

2. The method of claim 1, further comprising incorporating annotated business data into the information structure.

3. The method of claim 1, further comprising incorporating annotated design data into the information structure.

4. The method of claim 1, further comprising controlling data flow associated with the at least one collaborative process based on the information structure.

5. The method of claim 1, further comprising fetching one or more design data features for at least one of monitoring and tracking the collaborative process using the context pyramid structure.

6. The method of claim 1, wherein the at least one collaborative process is a business process.

7. The method of claim 1, wherein the at least one collaborative process is an engineering design process.

8. The method of claim 1, wherein the information structure is multi-dimensional.

9. The method of claim 1, wherein the information structure is multi-resolutional.

10. The method of claim 1, wherein the obtained information comprises annotated data.

11. The method of claim 1, wherein the obtained information comprises user input.

12. The method of claim 1, further comprising analyzing at least one of the obtained information and the information structure.

13. The method of claim 12, further comprising generating one or more action representations based on the analyzing.

14. The method of claim 13, wherein the analyzing is rule-based.

15. The method of claim 1, wherein the building further comprises:
   adding a virtual node beneath the lowest-level flow line;
   adding, to the flow line for each of the levels above the lowest-level flow line, a staffing node corresponding to the staffing node of the lowest-level flow line and an ending node corresponding to the ending node of the lowest-level flow line; and
   forming the context pyramid structure from the plurality of flow lines by connecting the virtual node to the starting node of the highest of the levels with a first vector and connecting the virtual node to the ending node of the highest of the levels with a second vector and then compressing all of the flow lines to cause the starting nodes to be placed on the first vector and the ending nodes to be placed on the second vector.

16. The method of claim 1, wherein the maintaining further comprises performing a checkpoint calculation for at least one of the levels of resolution of tasks in the collaborative process, when any of the checkpoints represented by the nodes on the flow line is missed, comprising recomputing a time offset for each successive one of the checkpoints on the flow line and adjusting the node that represents the successive one on the flow line.

17. Apparatus for managing a collaborative process performed in accordance with a first entity and at least a second entity, the apparatus comprising:
   a memory; and
   at least one processor coupled to the memory and operative to: obtain information associated with the collaborative process used to design and develop a given product; and based on at least a portion of the obtained information, dynamically build and maintain an information structure as a context pyramid structure to assist at least one of the first entity and the second entity in managing at least a portion of the collaborative process, wherein:

the context pyramid structure represents a status of the collaborative process and comprises a plurality of flow lines that represent a plurality of levels of resolution of tasks in the collaborative process; and the building and maintaining comprises:

creating a lowest-level flow line to represent a lowest-level of resolution, the lowest-level flow line corresponding to a timeline for completing the collaborative process, the timeline containing a plurality of checkpoints for completing the collaborative process, each of the checkpoints represented on the lowest-level flow line by a node, the nodes comprising at least a starting node representing a starting checkpoint on the timeline and an ending node representing an ending checkpoint on the timeline; and iteratively creating at least one next-higher level flow line to represent a next-higher level of resolution from a next-lower level flow line, for at least one pair of consecutive nodes on the flow line of the next-lower level, the next-higher level flow line corresponding to a next-higher-resolution timeline containing a plurality of higher-resolution checkpoints for completing a portion of the collaborative process that occurs between the checkpoints represented by the consecutive nodes on the lower-level flow line, each of the higher-resolution checkpoints represented on the next-higher level flow line by a node, the nodes on the next-higher level flow line comprising at least a starting node representing a staffing checkpoint on the next-higher-resolution timeline and an ending node representing an ending checkpoint on the next-higher-resolution timeline.

18. The apparatus of claim 17, wherein the building further comprises:

adding a virtual node beneath the lowest-level flow line;

adding, to the flow line for each of the levels above the lowest-level flow line, a starting node corresponding to the starting node of the lowest-level flow line and an ending node corresponding to the ending node of the lowest-level flow line; and forming the context pyramid structure from the plurality of flow lines by connecting the virtual node to the starting node of the highest of the levels with a first vector and connecting the virtual node to the ending node of the highest of the levels with a second vector and then compressing all of the flow lines to cause the starting nodes to be placed on the first vector and the ending nodes to be placed on the second vector.

19. An article of manufacture for managing a collaborative process performed in accordance with a first entity and at least a second entity, comprising a computer readable storage medium containing one or more programs which when executed by a computer implement:

obtaining information associated with the collaborative process used to design and develop a given product; and based on at least a portion of the obtained information, dynamically building and maintaining an information structure as a context pyramid structure to assist at least one of the first entity and the second entity in managing at least a portion of the collaborative process;

wherein the context pyramid structure represents a status of the collaborative process and comprises a plurality of flow lines that represent a plurality of levels of resolution of tasks in the collaborative process; and wherein the building and maintaining comprises:

creating a lowest-level flow line to represent a lowest-level of resolution, the lowest-level flow line corresponding to a timeline for completing the collaborative process, the timeline containing a plurality of checkpoints for completing the collaborative process, each of the checkpoints represented on the lowest-level flow line by a node, the nodes comprising at least a starting node representing a starting checkpoint on the timeline and an ending node representing an ending checkpoint on the timeline; and iteratively creating at least one next-higher level flow line to represent a next-higher level of resolution from a next-lower level flow line, for at least one pair of consecutive nodes on the flow line of the next-lower level, the next-higher level flow line corresponding to a next-higher-resolution timeline containing a plurality of higher-resolution checkpoints for completing a portion of the collaborative process that occurs between the checkpoints represented by the consecutive nodes on the lower-level flow line, each of the higher-resolution checkpoints represented on the next-higher level flow line by a node, the nodes on the next-higher level flow line comprising at least a starting node representing a starting checkpoint on the next-higher-resolution timeline and an ending node representing an ending checkpoint on the next-higher-resolution timeline.

20. The article of manufacture of claim 19, wherein the building further comprises:

adding a virtual node beneath the lowest-level flow line;

adding, to the flow line for each of the levels above the lowest-level flow line, a starting node corresponding to the starting node of the lowest-level flow line and an ending node corresponding to the ending node of the lowest-level flow line; and forming the context pyramid structure from the plurality of flow lines by connecting the virtual node to the starting node of the highest of the levels with a first vector and connecting the virtual node to the ending node of the highest of the levels with a second vector and then compressing all of the flow lines to cause the starting nodes to be placed on the first vector and the ending nodes to be placed on the second vector.

* * * * *